United States Patent Office 2,774,714
Patented Dec. 18, 1956

2,774,714

PROCESS FOR THE EXTRACTION OF SAPOGENINS FROM PLANT MATERIALS

Emanuel B. Hershberg, West Orange, and
David H. Gould, Leonia, N. J.

No Drawing. Application October 10, 1952,
Serial No. 314,198

19 Claims. (Cl. 195—32)

The present invention relates to an improved process for the recovery of sapogenoid substances from vegetable matter and more particularly to a procedure for the isolation of sapogenins directly from saponin-bearing plant materials.

The practice in the past for obtaining sapogenoid materials from plant sources containing saponins, has included extraction of the plant material to remove the saponins as such with alcohol, and/or other organic solvents, follwed by hydrolysis of the extracted crude saponins with mineral acid and extraction or precipitation of the crude sapogenins. In such known procedures, a considerable proportion of the extracting solvent is retained in the root material and is only recoverable with difficulty, if at all. Furthermore, rectification of the solvent in the extract is an expensive and time-consuming step. An improved process which avoided the use and concomitant losses and expensive work-up of such a solvent would obviously go far towards making plants a most valuable source of steroids, since the cost of the product would be materially decreased.

It has, moreover, been generally assumed that an initial extraction was necessary to separate the desired saponins from much of the undesired cellulosic and other plant materials. Such preliminary extraction, however, carried along numerous undesired solubles, so that upon subsequent acid hydrolysis, the extracts gave, along with the desired sapogenins, considerable tarry material from which it was difficult to separate the sapogenins. Yields have been found to vary considerably depending on the state of the tars, which determines the ease with which the desired product may be isolated, but in any case were quite low.

We have devised a process which entirely avoids the use of a saponin-extracting solvent, and furthermore permits the ready isolation of a better grade of sapogenins, the aglycone product, more easily without interference from tars. We have found that we can advantageously treat ground plant material directly with aqueous strong acid, using good stirring and heating for from one to twenty-four hours. This hydrolyzes the saponins present to insoluble sapogenins and water soluble sugars. There is still, however, a large amount of cellulosic material present with which the sapogenin is mixed and which adsorbs various impurities, like tars. The total solids are readily filtered from the aqueous acid and washed, neutralized and dried. At this point about one-half the weight has been removed as water soluble sugars and other components, and the decrease in bulk naturally permits easier handling thereafter.

The dried digested material is now treated with an organic solvent and the desired sapogenin is readily extracted, free from tarry impurities. The solvent may easily be recovered by distillation, or preferably by steam distillation when a water-immiscible solvent is used. The product obtained is already in a satisfactory state of purity since the major impurities have remained behind on the cellulosic plant material, but further purification by crystallization is easily achieved.

The plant sources which we can use are widespread and varied. Our process is generally applicable to the hydrolysis of glycosidic steroid substances in their native state, and to the isolation of the aglycones of the steroid saponins. The saponins are defined as glycosides of alcohols or phenols which have the property of producing stable foams on shaking with water. The saponins with which the present invention is concerned occur mainly in plants of the order Liliflorae, and particularly in the families Liliaceae, Amerillidaceae and Dioscoreaceae. Included are such diverse plants as yuccas, agaves, dioscoreas, sarsaparillas, trilliums and other lilies, henequen, sisals, etc. The aglycone portions which are isolated from the plant material itself by our process constitute water-insoluble steroid sapogenins in contrast to the water-soluble saponins native to the plants. The glycosides may be found in the roots, stalks, seeds, leaves, flowers or fruits, which should be finely ground, so as to break the cellular structure, to permit access of the acid to the glycosidic compounds.

In carrying out our process, the ground materials are suspended in hot aqueous acid with or without stirring for a greater or less time, depending on the strength and concentration of the acid. As acids we may use any acid with a minimum ionization constant $K_a = 1 \times 10^{-3}$ and preferably as strong as $K_a = 1 \times 10^{-2}$ or stronger. For example, we may use sulfonic acids such as toluenesulfonic, methyl or ethylsulfonic, chlorosulfonic; mineral acids such as sulfuric, hydrochloric, hydrobromic, phosphoric, sulfurous, phosphorous; and other acids such as chloroacetic, dichloracetic, trichloracetic, bromoacetic, trifluoroacetic, oxalic, maleic, o-nitrobenzoic, thiosulfuric, etc. There should not, of course, be used strongly oxidizing acids such as periodic, iodic, selenious, or nitric which would chemically react with and oxidize the organic materials. It is understood that acid reacting reagents such as aluminum chloride, zinc bromide, phosphoric anhydride, sulfurtrioxide, etc., can also be used since they are equivalent to the acids in aqueous solution. The desired concentration of the acid varies with the strength of the acid from about 2% to about 50%, preferably from a 5% to a 20% aqueous solution.

We have found that heat must be applied, and preferably at temperatures from about 75° C. to about 150° C., in order to achieve hydrolysis in a reasonable time. Ordinarily, heating with steam on an open steam bath gives temperatures of from 80° to 95° C. which are satisfactory for the purpose; but higher temperatures will, of course, give more rapid reaction, and therefore we may use high pressure steam or superheated steam or other means to raise the temperature to the boiling point. We have also found it at times to be advantageous to use a closed vessel or autoclave and maintain a temperature above 100° C. and a mild pressure up to about 75 pounds per square inch to raise the boiling point of the mixture, thereby gaining still higher temperatures and a more rapid rate of reaction.

After the solid material is filtered and washed, it is neutralized carefully with a base such as sodium hydroxide, potassium hydroxide, barium oxide, calcium oxide or hydroxide, soda lime, etc. in order to remove final traces of acid which might decompose some of the material when the solid is dried. The mixture is then dried and extracted, preferably hot, with an organic solvent to separate the desired sapogenin from the insoluble cellulosic remainder. As solvents, we generally prefer the water-immiscible materials including hydrocarbons such as hexane, ligroin, heptane, octane, gasoline, naphtha, kerosene, benzene, toluene, and xylene; halogenated solvents such as chloroform, ethylene chloride, methylene chloride, ethyl bromide, tetrachloroethylene, trichloroethylene; and others such as ethyl ether, isopropyl ether, butyl ether, diethyl ketone, methylisopropylketone, methylisobutylketone, ethylacetate, isopropylacetate, butylacetate, n-butanol, amylalcohol, etc. These are easily recoverable by steam distillation. It is, of course, possible to use water-miscible solvents such as methyl, ethyl or isopropyl alcohol, acetone, etc., but the solvent recovery is then likely to be more difficult.

We have found that generally we obtain a relatively pure product on concentration or evaporation of the extracting solvent. This is partially due to the adsorbent effect of the remaining cellulosic material, which aids in the removal of impurities. In certain cases, however, the original plant materials contain considerable fatty or waxy material which would contaminate the product at this point. In these cases, a preliminary treatment with a de-waxing solvent such as ligroin, hexane, benzene, etc. removes the fats and waxes, leaving the glycosides to be hydrolyzed by our new procedure, and giving a relatively pure product.

As illustration of the old type of process, we cite the following examples:

(A) EXTRACTION OF DIOSCOREA ROOTS

A sample of *D. machrostachya* root was sliced, air-dried and ground to 8 to 100 mesh fineness. This product still contained about 7% water. A sample of 2880 g. of the ground dried root was extracted by boiling 8 l. of 95% 2B ethanol and allowing the refluxing condensate to drip through the material. After 20 hours, the extract was removed and steam was slowly passed through the extracted root mass (weight, 4812 g.) to recover the alcohol absorbed. The recovery is shown in Table I.

TABLE I

| Fraction | Volume, ml. | Boiling Point, °C. | Density, g./cc. | Purity of Alcohol, Percent | Abs. Alcohol Recovered, ml. |
|---|---|---|---|---|---|
| 1 | 500 | 70–77 | 0.824 | alcohol and benzene. | ca. 450 |
| 2 | 500 | 77–78 | 0.815 | 91 | 455 |
| 3 | 500 | 78–80 | 0.819 | 90 | 450 |
| 4 | 500 | 80–82 | 0.834 | 84 | 420 |
| 5 | 300 | 82–85 | 0.850 | 77 | 231 |
| 6 | 250 | 86–90 | 0.874 | 66 | 165 |
| 7 | 300 | 90–94.4 | 0.911 | 51 | 153 |
| 8 | 200 | 95–96 | 0.940 | 38 | 76 |
| Total | | | | | 2,400 |

Further distillation gave alcohol of still lower concentration, not useful for recovery. Since it is necessary to use at least 90% alcohol (preferably 95%) for extractions, it is apparent that only 1355 ml. (fractions 1–3) could be used without rectification.

The exhausted sample was dried and weighed 2190 g., showing that 2622 g. of solvent had been absorbed, corresponding to 3200 ml. of 90% ethanol. Thus only about 50% of the absorbed solvent was recovered in a form usable directly without any expensive rectification procedure. Even with the most involved fractional distillation column, at most only 75% of the alcohol is recoverable and 25% must be lost.

The extract (5 l. volume) was distilled to give a dry residue weighing 690 g. of crude diosin saponin, and an alchohol distillate of 4100 ml. Thus the total recovery of usable solvent from the original 8 liters was only 5600 ml., with a loss of 2400 ml. or roughly 275 gal./ton. In addition, there is a further loss of 150 gal./ton used in the hydrolysis and not recoverable.

(B) HYDROLYSIS OF DIOSIN SAPONIN

The dry resinous diosin saponin from Example (A) (690 g.) was taken up in two volumes (1400 ml.) of 95% alcohol and treated with 400 ml. of concentrated hydrochloric acid. The mixture was stirred while refluxing for three hours. The mixture was treated with 1 liter of toluene and stirred for 15 minutes. After cooling, the liquid was decanted from the heavy tars which had formed, and diluted with water. The toluene layer was separated and washed neutral with water.

The tars were redissolved in 500 ml. of hot alcohol and again treated with toluene to remove as much as possible of the admixed sapogenin. The combined toluene layers were then distilled to dryness recovering about 85% of the toluene used. The residue of very crude semi-crystalline diosgenin weighed 280 g. This could be crystallized from acetic acid to give about 55 g. of rather impure diosgenin, M. P. 180–195° C. $[\alpha]_D$ —101° (CHCl$_3$). The yield is about 2% from the dried roots. It has usually been preferred to acetylate the total crude as shown in Example (C).

(C) ACETYLATION OF CRUDE DIOSGENIN

The crude semi-crystalline diosgenin of Example (B) (280 g.), was treated with one volume (280 ml.) of acetic anhydride and the mixture was distilled until the temperature reached 135° C. On cooling and chilling, the solution became solid with crystals which were filtered off, washed with dilute acetic acid and cold methanol, and dried. The yield of technical diosgenin acetate, M. P. 185–192° C. $[\alpha]_D$ —110° (CHCl$_3$), was 57 g., or 2% from the dried roots. Crystallization from isopropanol gave the pure material, M. P. 193–5° $[\alpha]_D$ —114° (CHCl$_3$).

Because tars are responsible for much of the difficulties in the known methods of separating the sapogenin produced by the hydrolysis, we have improved the known procedure in the manner indicated in Example (D), which shows a greater recovery of diosgenin by reason of the fact that the tar is converted into a granular form. This different physical form permits more complete extraction, but even here recovery is not complete, since we obtain somewhat better yields by our new process, which is described in Examples 1 to 7 below.

(D) EXTRACTION AND HYDROLYSIS OF SAPONIN AND PREPARATION OF DIOSGENIN ACETATE

A sample of 2 kg. of dried ground dioscorea roots was extracted as in Example (A) to give 495 g. of crude dioscin extract. This was treated with two volumes of alcohol and 300 ml. of concentrated hydrochloric acid as in Example (B) with the exception that very vigorous stirring and boiling was maintained for only 1½ hours. When toluene was added this time, followed by water, the tars were precipitated in a fine state of sub-division rather than as a sticky lump. The mixture was readily filterable and the toluene layer was washed and evaporated. The granular crude diosgenin weighed 210 g. and there was no further significant amount obtained by re-extraction of the tars. Acetylation of the residue with 210 ml. of acetic anhydride as in Example (C) gave 49.5 g. of relatively pure diosgenin acetate, M. P. 187–194° C. $[\alpha]_D$ —113° (CHCl$_3$) about 2.5% yield from the dried roots.

The procedure in accordance with our invention is set forth in detail and by way of illustration in the following examples:

*Example 1.—Combined hydrolysis of diosin and purification of diosgenin from dioscorea*

A sample of 2 kg. of ground and dried dioscorea roots containing about 7% water as in Example (A) was suspended in 15 l. of 2 N hydrochloric acid and the mass was stirred while heating on the steam bath for seven hours at a temperature of 82–90° C. The mixture was cooled and filtered, and the solid was washed with water. The cake was suspended in a minimum volume of water and the residual acid neutralized with a dilute sodium hydroxide solution. The mass was again filtered off, washed and dried in an oven at 80° C.

The dried solid weighed 1012 g., a loss of roughly 50% as water- and acid-soluble substances. The dry material was extracted with 4 l. of boiling toluene in a continuous extractor which allowed the solvent to drip through the mass after condensing. After extracting for 2 hours, the extract solution (3.4 liters) was removed and steam blown through the solids to recover the absorbed solvent. Separation of the collected distillate gave 675 ml. of toluene suitable for re-use.

The toluene solution was steam distilled and separation of the distillate gave 2905 ml. of toluene suitable for re-use. Thus a total of 3580 ml. of toluene were recovered, or 89-90% of the amount used.

In the distillation flask, the crude diosgenin had precipitated as the solvent was removed. This was filtered from the water and dried in the oven. It weighed 62.5 g. and had a M. P. of 188-194° C. $[\alpha]_D -107°$ (CHCl$_3$), equivalent to the usual technical grade without purification. One crystallization from isopropanol gave 59.5 g. of pure diosgenin, M. P. 205-208°, $[\alpha]_D -121°$ (CHCl$_3$).

Acetylation as in Example (C) gave 60.2 g. of pure diosgenin acetate, M. P. 196-199° C., $[\alpha]_D -122°$ (CHCl$_3$). The overall yield was therefore about 3%.

It is notable that not only was no alcohol used in the process, and that no more of the toluene extractant was lost than in the prior procedure, but also that the first product obtained, in somewhat higher yield, was much less impure than that obtained by the known process. Instead of the initial heating on the steam bath, the roots can be heated with the acid solution at about 110° C. and at about 10 lbs. pressure.

Example 2.—Hydrolysis of Mexican sisal

The leaves and stalks of Mexican sisal plants were ground and dried. A sample of 1 kg. was extracted with 3 liters of refluxing hexane to remove fats and waxes. The solid was filtered off, dried and suspended in 7 liters of 4 N sulfuric acid in an autoclave. The mixture was stirred and heated at 125° C. for 1 hour. The cooled mixture was filtered and the solid neutralized and dried. The dry solid was extracted with boiling ethylene chloride and the residual solid filtered off. On evaporation of the solvent, there was obtained 7 g. of crude hecogenin which was acetylated as in Example (C) to give 2.9 g. of hecogenin acetate, M. P. 240-245° C., $[\alpha]_D -3°$ (CHCl$_3$).

Example 3.—Hydrolysis of yucca saponin

A sample of 1 kg. of dried powder obtained by grinding the leaves of a yucca species from Arizona was defatted with ether and dried. The solid was suspended in 2 N sulfuric acid (5 l.) and heated to 90-95° C. with stirring for 24 hours. The solid was filtered off, washed, neutralized by stirring with lime, refiltered, washed and dried in a draft oven. The dry powder was extracted with hot heptane and the solid filtered off and washed with hot heptane. On steam distillation of the solvent, crude sarsasapogenin was precipitated. This was filtered off, dried and acetylated by heating with 40 ml. of acetic anhydride. The water-precipitated product was filtered off and recrystallized from methanol to give sarsasapogenin acetate, M. P. 132-137° C. $[\alpha]_D -65°$ (CHCl$_3$), weighing 10.2 g.

Example 4.—Hydrolysis of oleandrin in oleander leaves

Leaves of the oleander (*N. Oleander*) were macerated and dried. A sample of 1 kg. of the dried leaves was treated with 7 l. of 10% p-toluenesulfonic acid and heated to 85-90° C. with stirring for 12 hours. The mixture was cooled, filtered, washed, neutralized, and dried as in Example 3. The dried powder was extracted with isopropyl ether, and the extract evaporated to dryness. The residue, crude dianhydrogitoxigenin, was recrystallized from methanol to give dianhydrogitoxigenin, M. P. 205-208° C.

Example 5.—Hydrolysis of licorice root saponin

Licorice roots (*G. glabra*) were ground and dried, and 500 g. of the powder was suspended in 20% trichloroacetic acid (3 l.). The slurry was stirred and heated at 90-95° C. for 18 hours. The cooled mixture was filtered, washed, neutralized, and dried as in Example 3. The dried product was extracted by refluxing ethyl alcohol through the material. The extract was evaporated and the residue recrystallized from acetic acid to give glycyrrhetic acid, M. P. 292-295° C. $[\alpha]_D +91°$ (CHCl$_3$). This is a triterpenoid sapogenin.

Example 6.—Hydrolysis of guaiac bark saponin

A sample of dried ground guaiac bark (500 g.) was suspended in 4 litres of 4 N sulfuric acid. The mixture was heated 24 hours with stirring at 90-95° C. The cooled mass was filtered off and worked up as in Example 5. The alcohol extract was evaporated to give the crude genin which was recrystallized from acetic acid, giving oleanolic acid, a triterpenoid sapogenin. This was acetylated as in Example 3, and recrystallized from isopropanol, giving oleanolic acid acetate, M. P. 262-266° C., $[\alpha]_D +72°$ (CHCl$_3$).

Example 7.—Hydrolysis of lily of the valley saponin

Leaves and flowers of lily of the valley (*C. majalis L.*) were ground and dried. A sample of 500 g. of dried material was heated with 3 litres of 1 N sulfuric acid at 85-90°, and stirred for 20 hours. The solid was filtered off, washed and dried as in Example 3. The sapogenin was extracted with hot toluene and the crude product obtained on steam distillation was filtered and dried. It was dissolved in 5 volumes of pyridine, treated with 1 part of benzoyl chloride and allowed to stand overnight. The mixture was thrown into water and the precipitated material was filtered off. On crystallization from ethylacetate, it gave crystalline monoanhydroconvallatoxigenin benzoate, M. P. 275-278° C. $[\alpha]_D +21°$ (CHCl$_3$).

Our improved extraction process can be applied not only to the plant material which has been comminuted and preferably also dried immediately upon harvesting, but also to plant material which has been comminuted to a degree such that it is for the most part composed of particles of 8 to 200 mesh size or smaller, and then subjected to a preliminary fermentation of from 1 to 21 days, and preferably about 5 days at temperatures of about 15° to 40° C., followed by drying, in order to increase the yield of steroid material, as described in the copending application of David H. Gould et al. entitled "Process for the Recovery of Saponins and Sapogenins From Vegetable Matter," Serial No. 313,368, filed October 6, 1952.

In this manner, the yield of diosgenin is increased to 5 to 7% of the weight of dry roots of dioscorea, compared to the 3% obtained in Example 3.

Other variation from the specific details above described may be resorted to within the scope of the appended claims without departing from the spirit of the invention.

It is easily seen that a continuous process may be devised to accomplish the process which we have described as a batch process. For example, the ground plant material could be introduced to a stream of acid which would flow through heated pipes for the proper length of time. At the end the solid could be continuously filtered off, washed, neutralized, and dried, while the acid in the filtrate might be recycled for further use after fortification.

We claim:
1. Process for the extraction of steroid sapogenins from steroidal saponin-bearing plant material of a family of the group consisting of Liliaceae, Amerillidaceae, and Dioscoreaceae, which comprises subjecting the plant material to the action of aqueous non-oxidizing acid to effect hydrolysis of the saponins contained therein and form the water-insoluble steroidal sapogenin, subsequently separating the acid solution from the insoluble material containing the said sapogenin and the fibrous residue of the plant material, and extracting the said insoluble material with a substantially water-immiscible organic solvent for the sapogenin.

2. Process for the extraction of steroid sapogenins from steroidal saponin-bearing plant material of a family of the group consisting of Liliaceae, Amerillidaceae, and Dioscoreaceae, which comprises comminuting and drying the plant material, subjecting the same to the action of aqueous non-oxidizing acid of a concentration of about 2 to 50% and at a temperature of at least 75° C. to effect hydrolysis of the saponin contained therein and form the water-insoluble steroidal sapogenin, subsequently cooling the mixture and filtering the same, neutralizing the filter cake containing the said sapogenin and the fibrous residue of the plant material, extracting the filter cake with an organic solvent for the sapogenin, and recovering the sapogenin from the extract.

3. Process for the extraction of sapogenins from steroidal saponin-bearing plant material which comprises comminuting the plant material, fermenting the comminuted matter for at least a day to effect increase of steroid saponin in the plant material, subjecting the fermented material to the action of aqueous non-oxidizing acid of a concentration of about 2 to 50%, to effect hydrolysis of the steroidal saponins contained therein, subsequently separating the acid solution from the insoluble material and extracting the latter with a substantially water-immiscible organic solvent for the sapogenin.

4. Process according to claim 2, wherein the extracted sapogenin is separated from the organic solvent by distillation of the latter.

5. Process according to claim 2, including the step of preliminarily extracting the plant material with an organic solvent to remove fats and waxes.

6. Process according to claim 2, wherein the heating with aqueous acid takes place at temperatures above 100° C. under superatmospheric pressure.

7. Process according to claim 2, wherein the extraction with the organic solvent takes place under reflux.

8. Process according to claim 2, wherein the organic solvent is a light petroleum fraction.

9. Process according to claim 8, wherein the organic solvent is expelled from the extract by steam distillation.

10. Process according to claim 2, wherein the acid has a dissociation constant of at least $1 \times 10^{-3}$.

11. Process for the extraction of diosgenin from diosin-bearing plant material, which comprises subjecting ground and dried dioscorea roots to the action of dilute non-oxidizing mineral acid of a concentration of about 2 to 50% and at elevated temperature, subsequently cooling and filtering the mixture, neutralizing the residue containing the water-insoluble diosgenin together with fibrous plant material with a metal base, washing and drying the residue, extracting the same with an organic solvent for diosgenin, and separating the obtained diosgenin from the extract.

12. Process for the extraction of hecogenin from sisal plant material containing the same, which comprises extracting such plant material with a solvent for fats to remove fats and waxes, separating the residue and drying the same, subjecting the dried residue to the action of dilute non-oxidizing mineral acid of concentration of about 2 to 50% and at a temperature of about 125° C. under pressure, subsequently cooling the mixture and filtering the same, neutralizing the residue containing the water-insoluble hecogenin together with the fibrous plant material and drying the same, and extracting the residue with an organic solvent for hecogenin, and separating the hecogenin from the extract.

13. Process for the extraction of sarsasapogenin from yucca plant leaves which comprises extracting the dried leaves in powdered condition with a solvent for fats to extract fats and waxes, drying the residue, subjecting the same to the action of dilute non-oxidizing mineral acid of a concentration of about 2 to 50% at elevated temperature, subsequently filtering off the solid material and washing the same, neutralizing the residue containing the water-insoluble sarsasapogenin together with fibrous plant material and drying the same, extracting the dried residue with an organic solvent for sarsasapogenin, and separating the latter from the extract.

14. Process according to claim 1, wherein the treatment with aqueous acid takes place at temperatures above 100° C. under pressure.

15. Process according to claim 11, wherein the treatment with acid takes place at about 110° C. at about 10 lbs. pressure.

16. Process according to claim 3, wherein the insoluble material is neutralized and dried before it is treated with the solvent for the sapogenin.

17. Process according to claim 3, wherein the fermentation proceeds for a period of about five days at room temperature.

18. Process according to claim 3, wherein the plant material comprises roots of the family Dioscoreaceae, and wherein the recovered sapogenin is diosgenin.

19. Process for the extraction of diosgenin from Dioscorea roots, which comprises comminuting the roots, fermenting the resulting pulp in its own juice for a period of at least one day, subjecting the fermented material to the action of aqueous non-oxidizing acid of a concentration of about 2 to 50% to effect hydrolysis of the diosin saponin contained therein, separating the acid solution from the insoluble material containing the water-insoluble diosgenin and fibrous plant material, and extracting the said insoluble material with a solvent for diosgenin.

References Cited in the file of this patent
UNITED STATES PATENTS

| | | |
|---|---|---|
| 2,069,687 | Stoll et al. | Feb. 2, 1937 |
| 2,408,834 | Wagner | Oct. 8, 1946 |
| 2,686,752 | Wall | Aug. 17, 1954 |

OTHER REFERENCES

Chem. Abstracts, vol. 26, page 39155 (1932).
Winterstein, Zertschrift für Physiol. Chem., vol. 199, 1931, pp. 25–37.
Wall, J. Brochem, vol. 192, Oct. 1952, pp. 533–541.
Rothman et al.: J. A. C. S., rec'd Mar. 10, 1952, vol. 74, pp. 5791–5792.